(12) United States Patent
Johannsen

(10) Patent No.: US 12,435,277 B2
(45) Date of Patent: Oct. 7, 2025

(54) COST EFFICIENT INTEGRATION OF HYDROTHERMAL LIQUEFACTION AND WET OXIDATION WASTEWATER TREATMENT

(71) Applicant: CIRCLIA NORDIC APS, Aarhus (DK)

(72) Inventor: Ib Johannsen, Aarhus (DK)

(73) Assignee: Circlia Nordic ApS, Aarhus (DK)

( * ) Notice: Subject to any disclaimer, the term of this patent is extended or adjusted under 35 U.S.C. 154(b) by 0 days.

(21) Appl. No.: 17/786,948

(22) PCT Filed: Dec. 20, 2020

(86) PCT No.: PCT/DK2020/050397
§ 371 (c)(1),
(2) Date: Jun. 17, 2022

(87) PCT Pub. No.: WO2021/121526
PCT Pub. Date: Jun. 24, 2021

(65) Prior Publication Data
US 2023/0013664 A1    Jan. 19, 2023

(51) Int. Cl.
*C10G 1/06*    (2006.01)
*C02F 1/02*    (2023.01)
(Continued)

(52) U.S. Cl.
CPC .............. *C10G 1/065* (2013.01); *C02F 1/025* (2013.01); *C02F 1/74* (2013.01); *C02F 11/18* (2013.01);
(Continued)

(58) Field of Classification Search
CPC ............ C10G 1/065; C10G 2300/1011; C10G 2300/4081; C02F 1/025; C02F 1/74; C02F 11/18; C02F 2103/26; C02F 2303/10
See application file for complete search history.

(56) References Cited

U.S. PATENT DOCUMENTS

| 10,711,201 B2 | 7/2020 | Texier et al. |
| 2003/0189012 A1* | 10/2003 | Cansell ................ B01J 3/008 210/761 |

(Continued)

FOREIGN PATENT DOCUMENTS

| CA | 1332764 B2 | 10/1994 |
| CN | 104710066 A1 | 6/2015 |

(Continued)

OTHER PUBLICATIONS

Cao et al. (Hydrothermal liquefaction of agricultural and forestry wastes: state-of-the art review and future prospects, 2017, Bioresource Technology, vol. 245, pp. 1184-1193). (Year: 2017).*

(Continued)

*Primary Examiner* — Youngsul Jeong
(74) *Attorney, Agent, or Firm* — Robert C. Casad, Jr.

(57) ABSTRACT

Aqueous wastewater from hydrothermal liquefaction (HTL) systems is typically high in chemical oxygen demand (COD), which renders classic aerobic wastewater treatment to be prohibitively expensive. HTL wastewater can be processed using thermochemical wet oxidation in a manner that is not only cost efficient but also contributes more heat than is required for the energetically demanding HTL process. Provided are methods and devices for integrated hydrothermal liquefaction of biomass and treatment of resulting wastewater.

7 Claims, 3 Drawing Sheets

(51) Int. Cl.
C02F 1/74 (2023.01)
C02F 11/18 (2006.01)
C02F 103/26 (2006.01)

(52) U.S. Cl.
CPC ...... C02F 2103/26 (2013.01); C02F 2303/10 (2013.01); C10G 2300/1011 (2013.01); C10G 2300/4081 (2013.01)

(56) References Cited

U.S. PATENT DOCUMENTS

| | | | |
|---|---|---|---|
| 2011/0127778 A1* | 6/2011 | Kinney | C10J 3/80 290/1 R |
| 2017/0233659 A1 | 8/2017 | Pardo et al. | |
| 2017/0342327 A1 | 11/2017 | Texier et al. | |
| 2019/0016373 A1 | 1/2019 | Urimoto et al. | |

FOREIGN PATENT DOCUMENTS

| | | |
|---|---|---|
| CN | 1066938 B | 12/2016 |
| EP | 22206688 A1 | 7/2010 |
| GB | 1911294.5 | 9/2019 |
| GB | 2586145 A | 2/2021 |
| JP | H02268894 A | 2/1990 |
| JP | 2000157999 A1 | 6/2000 |
| WO | 2015173438 A1 | 11/2015 |
| WO | 2016004958 A1 | 1/2016 |
| WO | 2016169927 A1 | 10/2016 |

OTHER PUBLICATIONS

Leon et al. (Hydrothermal liquefaction (HTL) of animal by-products: Influence of operating conditions, 2019, Waste Management, vol. 99, pp. 49-59) (Year: 2019).*

Bhargava, S. et al. "Wet Oxidation and Catalytic Wet Oxidation," Ind. Eng. Chem. Res. 2006, 45, 1221-1258, American Chemical Society.

Gu, Y. et al. "Biological systems for treatment and valorization of wastewater generated from hydrothermal liquefaction of biomass and systems thinking: A review," Bioresource Technology 278 (2019) 329-345, Elsevier.

He, W. et al. "Application of hydrothermal reaction in resource recovery of organic wastes," Resources, Conservation and Recycling 52 (2008) 691-699, Elsevier.

Jensen, C. et al. "Fundamentals of HydrofactionTM: Renewable crude oil from woody biomass," Biomass Conv. Bioref. (2017) 7:495-509, Springer.

Leng, L. and Zhou, W. "Chemical compositions and wastewater properties of aqueous phase (wastewater) produced from the hydrothermal treatment of wet biomass: A review," Energy Sources Part A—Recovery Utilization and Environmental Effects vol. 40 Issue: 22 pp. 2648-2659, Taylor and Francis.

Si, B. et al. "Inhibitors degradation and microbial response during continuous anaerobic conversion of hydrothermal liquefaction wastewater," Science of the Total Environment 630 (2018), 1124-1132, Elsevier.

Van Dyk, S. et al. "Assessment of likely Technology Maturation Pathways for biojet production from forest residues," IEA Bioenergy Task 39 Vancouver, University of British Columbia.

Xu, D. et al. "Catalytic supercritical water gasification of aqueous phase directly derived from microalgae hydrothermal liquefaction," International Journal of Hydrogen Energy 44 (2019) 26181-26192, Elsevier.

Zhu, Y. et l. Techno-economic analysis of alternative aqueous phase treatment methods for microalgae hydrothermal liquefaction and biocrude upgrading system, Algal Research (2019) 39:101467 Elsevier.

Office action in related case (english translation), Chinese Intellectual Property Office.

* cited by examiner

COST EFFICIENT INTEGRATION OF HYDROTHERMAL LIQUEFACTION AND WET OXIDATION WASTEWATER TREATMENT

FIELD

The invention relates to methods and systems for thermochemical processing of lignocellulosic biomass, in general, and to hydrothermal liquefaction (HTL) in particular.

Hydrothermal Liquefaction (HTL) processes provide efficient conversion of biomass including high value feedstocks such as wood and straw as well as low or negative value feedstocks such as sewage sludge and manure. HTL systems can be configured in many different ways but generally produce a primary product such as bio crude oil, a combustible gas side stream and a significant amount of conversion product recovered as an aqueous phase with soluble organic constituents including organic acids, alcohols, aldehydes, phenols, furfural derivatives and nitrogen heterocyclic components.

In some process configurations, the aqueous product is perpetually recycled, along with some portion of the product oil stream, whereby aqueous organic solutes are eventually converted to oil, gas and char. See e.g. Jensen 2017. Other HTL processes where product oil is not recycled produce an aqueous wastewater fraction which is typically a portion of the aqueous product stream that is removed while the remainder is recycled. HTL wastewater requires further processing because it is enriched in organic pollutants which act as inhibitors of various metabolic processes in nature. For review, see Leng 2018.

HTL wastewater is typically very high in chemical oxygen demand (COD), literally 100 g/L or more when the aqueous phase has been recycled several times in the process. This renders classical aerobic biological wastewater treatment approaches prohibitively expensive. In a recent technoeconomic analysis the cost of classical wastewater treatment units were 2-3 times more costly than the HTL process plant itself. See Van Dyk et al, 2019, p 161. A variety of biological approaches to treatment and "valorization" of HTL wastewater streams have been reported. For review see Gu 2019. Anaerobic digestion to biomethane has been promising in theory but difficult to achieve in practice due to the inhibitory effect of HTL wastewater solutes. See e.g. Si 2018. Electrolytic conversion of HTL wastewater has been proposed, although this consumes energy without contributing any value to the HTL process. See WO2016169927. Dedicated thermochemical processing has also been proposed, with an aim of valorization, particularly including hydrothermal gasification of HTL wastewater. See Xu 2019, CN1066938. However, technoeconomic studies indicate that this approach will also prove prohibitively costly. See e.g. Zhu 2019.

We have discovered that, in part because of its high COD content, HTL wastewater can be processed using thermochemical wet oxidation in a manner that is not only cost efficient but able to contribute more heat than is required for the energetically demanding HTL process. Wet oxidation is well known as a method of wastewater treatment for problematic streams rich in bio-resistant organic pollutants. For review see Bhargava 2006, He 2007. In wet oxidation, compressed air or oxygen is added to an aqueous feedstock under high pressure and temperature with or without added catalyst. By conducting the wet oxidation process at or near the critical point of water, the rich stream of organic solutes can be oxidized, providing excess heat for the HTL process. This excess can readily be "harvested" through careful organization of heat-exchange systems in an integrated HTL/wet oxidation process design. Residual COD remaining in the process stream after wet oxidation is typically readily digestible by ordinary anaerobic digestion.

DETAILED DESCRIPTION OF EMBODIMENTS

Figure 1:
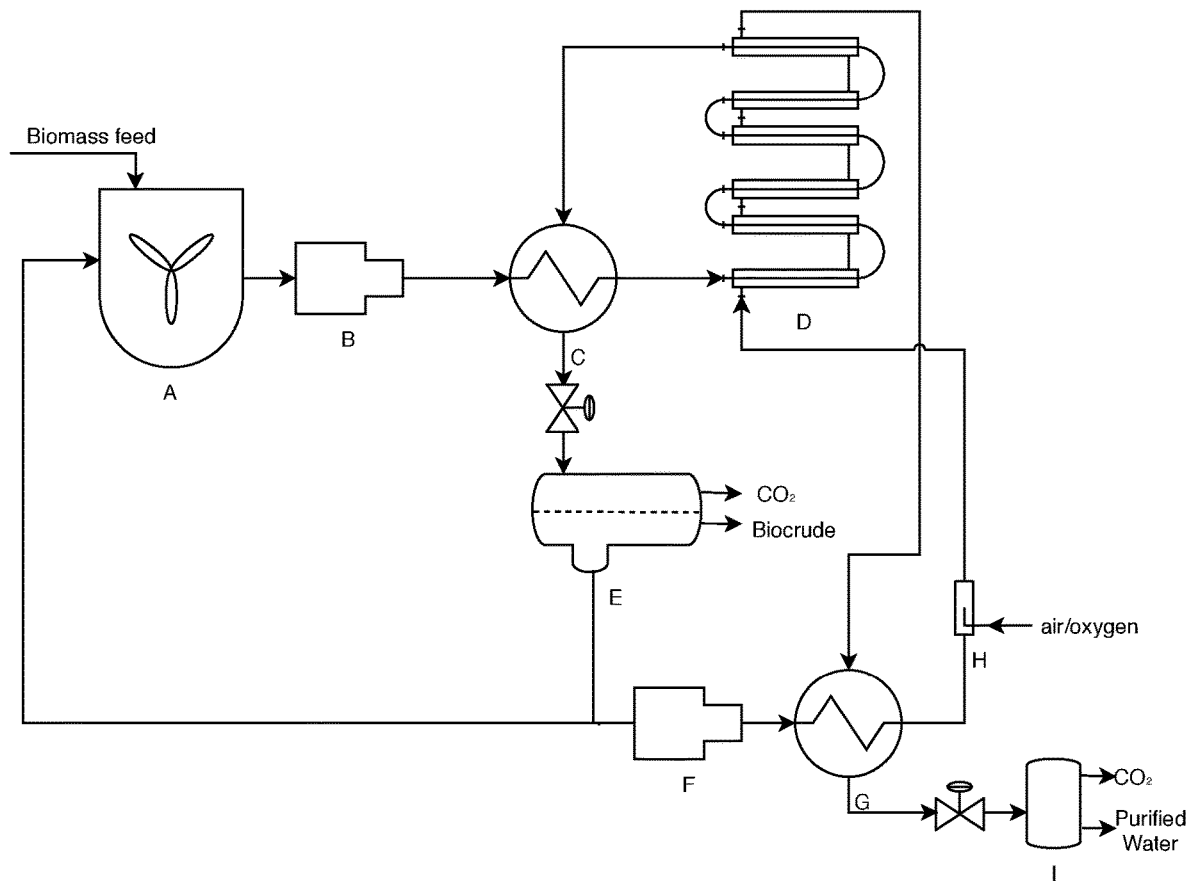
FIG. 1 shows one embodiment of an HTL system of the invention with integrated, co- or counter-current HTL/wet oxidation reactors.

In some embodiments, the invention provides a hydrothermal liquefaction (HTL) system in which energy needed for heating the HTL process is provided in whole or in part by an associated system for wet oxidation of organic content in the aqueous waste stream arising from said HTL process.

As used here, the term "associated system for wet oxidation" refers to a system that is organized in such manner as to provide heat for the HTL process, either through direct thermal contact, or through thermal contact mediated by a heat transfer medium, or through electrical power where the wet oxidation process generates offsetting electrical power.

In some embodiments, the invention provides a method of hydrothermal liquefaction (HTL) in which aqueous wastewater is subject to wet oxidation in such manner as to provide heat for the HTL process.

Wet oxidation of wastewater can be advantageously integrated with HTL by conducting the wet oxidation process in direct thermal contact with the HTL process via a heat exchange system. For example, in some embodiments, HTL of the biomass feedstock stream and wet oxidation of HTL wastewater are conducted on opposite sides of a tubular heat exchanger in ether a co- or counter-current fashion. A suitable heat exchanger for this purpose is the multitubular system described in UK1911294.5 which is hereby incorporated by reference in entirety.

Wet oxidation of HTL wastewater may also be performed in a separate, external unit. For example, in some embodiments, an external wet oxidation unit provides excess heat to the HTL process via a heat transfer medium such as high pressure steam, high pressure compressed water, hot oil or molten salt. After delivering excess heat to the HTL process, the product stream from the separate wet oxidation unit can further be used in an additional heat exchanger to preheat the feedstock stream to, for example, 250° C.

Wet oxidation of HTL wastewater may also be performed in a separate, external unit where thermal energy produced by the process is used to generate electrical power. In such embodiments, heat for the HTL process may be provided by electrical trim heating.

Methods of the invention are particularly suited for HTL systems in which some portion of aqueous product phase, but not product oil, are recycled. In such an HTL process, a biomass feed stream is typically about 10-25 wt % dry matter (DM) content. Assuming for conversion at 350° C. a product oil yield of 32 wt %, $H_2O$ and $CO_2$ yield of 15 wt %, and a char yield of 3 wt %, with 70% of the aqueous phase product recycled, the wastewater stream will have approximately 9.6 wt % DM content. Based on an HTL plant receiving 1000 kg biomass per hour on a dry matter basis and assuming an inherent energy yield from wet oxidation at 350° C. of wastewater dry matter at least 15 MJ/kg, the net heat produced by wastewater treatment corresponds to 150-350% of the net heat requirement for the HTL process.

Thus, by applying methods and systems of the invention, little or no energy input apart from pumping/energies are needed for the HTL process. The heat required for the HTL process is provided from wet oxidation of wastewater solutes, and at the same time the wastewater COD level is significantly reduced. Depending on the reaction time, temperature, catalyst and oxygen pressure, the COD reduction can be adjusted from partial to almost complete.

In some embodiments, the wet oxidation process may use in situ oxygen generation to supplement or replace compressed air. As will be readily understood by one skilled in the art, oxygen can be generated using comparatively inexpensive systems such as membrane-based concentrators, or, alternatively via more costly systems that provide additional advantages, such as an alkaline electrolyzer or a solid oxide electrolysis cell. Electrolysis will provide both oxygen and a valuable side stream of hydrogen that can be utilized for various processes such as hydrotreatment of the product biocrude oil. In some embodiments, electrolytically generated oxygen will ideally be compressed to around 200 bar before injecting into the wet oxidizer, which can provide a desired preheating of the produced oxygen.

In some embodiments, the reactor for the HTL process is tubular, or otherwise designed to provide some degree of tubular flow. The HTL reactor can ideally ensure a residence time of at least 300 seconds (5 minutes) up to 300 minutes. The diameter of the reactor is typically optimized to ensure good thermal transfer from the wet oxidation reactor and typical dimensions are between 15 mm and 100 mm and the length between 5-500 m or between 10 m and 500 m or between 50 m and 500 m. The flowrate in the HTL reactor is typically in the range of 0.05 and 2 m/s.

The reactor for the wet oxidation process can typically be of similar dimensions as the HTL reactor. In embodiments where the wet oxidation reactor is arranged in co- or counter-current direct thermal contact with the HTL reactor, both reactors can have similar dimensions. In some embodiments, the wet oxidation reactor is arranged as a tube within a tube heat exchanger with the HTL reactor residing in the central tube and the wet oxidation reactor residing in the outer tube shell. This arrangement of the reactors is feasible since the aqueous HTL wastewater typically contains no particulate material and is thus less prone to clog the layer between the inner and outer tube. In such a setup the wall thickness of the inner tube may be reduced to improve heat transfer as the outer tube wall will carry the main part of the pressure load. The wet oxidation residence time should be at least 5 minutes or at least 15 minutes or at least 30 minutes or up to 120 minutes. As the amount of water recycled is much less than the HTL flow, a longer residence time in wet oxidation can be readily obtained even where the HTL and wet oxidation reactors have the same inner volume.

In embodiments where heat transfer between the HTL and wet oxidation processes is made via an external medium or via an external heat sink—steam generator, the dimensions of the wet oxidation reactor can be independent of the HTL reactor dimensions. In some embodiments, the wet oxidation reactor can be a fed-batch system.

In some embodiments, the addition of air or an oxygen rich gas stream is performed using one or several injection points, such as gas spargers, to ensure the necessary amount of oxygen available for the reaction. The Injection points may be located near the entry of the wet oxidation reactor or distributed over the length of said reactor. This embodiment may also be made having two or more wet oxidation reactors placed in the system in a parallel or serial manner.

In some embodiments, the addition of air or an oxygen rich gas stream is performed in a manner where the said gas flow is controlled via a feedback loop (control system) to ensure a desired conversion rate and production of heat. This control system may also provide a means for avoiding overheating of the wet oxidation reactor. The feedback loop may be controlled by one or more sensors measuring temperature, pressure, or chemical characteristics of the reaction medium.

In some embodiments, the biomass feed to the HTL system is mixed with some portion of the aqueous product stream that is recycled to the process. In some embodiments, the biomass feed to the HTL reactor is introduced using a high pressure feed pump through a heat exchanger into an integrated reactor system having separate HTL and wet oxidation reactors arranged with integral heat transfer via direct thermal contact in a co- or counter-current manner.

Non-limiting examples of methods and systems of the invention are described in FIG. 1, any feature of which may be used in a HTL system of the invention in combination with any other system or feature known in the art. As shown, a biomass feed stream is combined with some portion of aqueous phase HTL product in a feed mixer (A). The mixed feedstock and recycled aqueous phase slurry is pre-heated by being fed through a high pressure feed pump (B) such as, for example, any of the pump systems described in WO2016/004958, which is hereby incorporated by reference in entirety, into a heat exchanger (C). The pre-heated feed stream is further pumped into the HTL component of an integrated reactor system (D) having separate HTL and wet oxidation reactors arranged co- or counter-current in direct thermal contact enhanced in some embodiments by heat exchangers such as those described in UK1911294.5. The output from the HTL component of an integrated HTL and wet oxidation reactor system (D) is fed through a heat exchanger (C) to contribute to pre-heating of the input feed, then released through a valve into a three phase separator (E) that separates a gaseous product phase, a product oil phase and an aqueous product phase. Some portion of the aqueous product phase separated by a three phase separator (E) is recycled to the HTL process by mixing with incoming feedstock in a feed mixer (A). Some portion of the aqueous product phase separated by a three phase separator (E) is pumped through a water phase feed pump (F) through a water phase heat exchanger (G) to pre-heat the wastewater stream prior to its being aerated/oxygenated by an air/oxygen sparger (H). The pre-heated, aerated/oxygenated wastewater stream is further pumped into the wet oxidation component of an integrated reactor system (D) having separate HTL and wet oxidation reactors arranged co- or counter-current in direct thermal contact. The output from the wet oxidation component of an integrated HTL and wet oxidation reactor system (D) is fed through a water phase heat exchanger (G) to pre-heat the wastewater stream prior to wet oxidation, then released through a valve into a water/gas separator (I) that separates a gaseous phase and a comparatively purified water phase.

Figure 2:
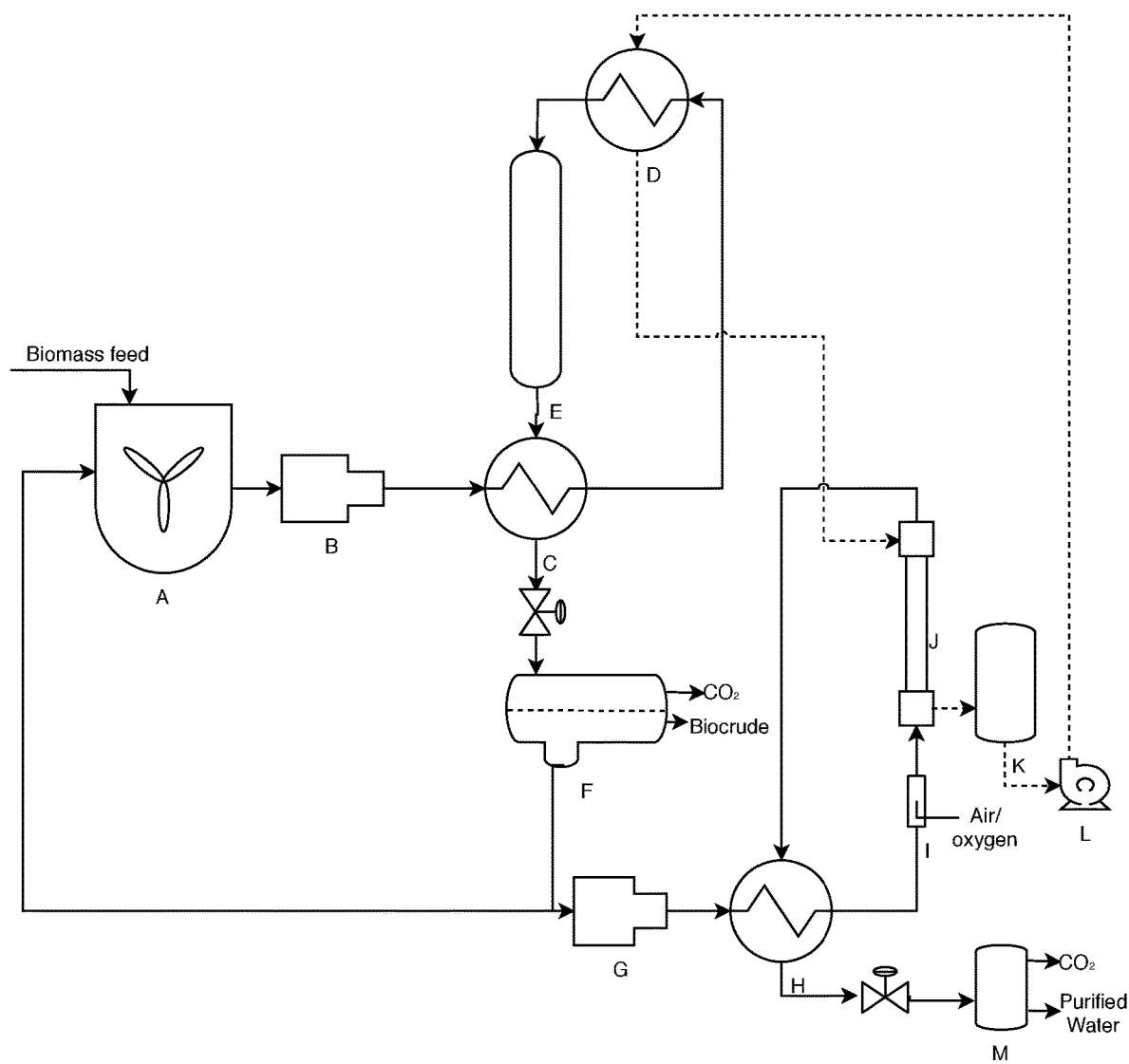
FIG. 2 shows one embodiment of an HTL system of the invention with external wet oxidation system and heat transfer loop.

Other non-limiting examples of methods and systems of the invention are described in FIG. 2, any feature of which may be used in an HTL system of the invention in combination with any other system or feature known in the art. As shown, a biomass feed stream is combined with some portion of aqueous phase HTL product in a feed mixer (A). The mixed feedstock and recycled aqueous phase slurry are pre-heated by being fed through a high pressure feed pump (B) such as, for example, any of the pump systems described in WO2016/004958, into a heat exchanger (C). The pre-heated feed stream is further heated by being pumped into a co-current heat exchanger with molten salt (D). The input feed heated to process temperature is further pumped into an HTL reactor (E). Output from an HTL reactor (E) is fed through a heat exchanger (C) to contribute to pre-heating of the input feed, then released through a valve into a three phase separator (F) that separates a gaseous product phase, a product oil phase and an aqueous product phase. Some portion of the aqueous product phase separated by a three-phase separator (F) is recycled to the HTL process by mixing with incoming feedstock in a feed mixer (A). Some portion of the aqueous product phase separated by a three phase separator (F) is pumped through a water phase feed pump (G) through a water phase heat exchanger (H) to pre-heat the wastewater stream prior to its being aerated/oxygenated by an air/oxygen sparger (I). The pre-heated, aerated/oxygenated wastewater stream is further pumped into a wet oxidation reactor with molten salt cooling (J). The molten salt cooling system for wet oxidation reactor (J) comprises a molten salt buffer tank (K) from which molten salt is pumped by molten salt pump (L) to a co-current heat exchanger with molten salt (D) to transfer heat from molten salt cooling to the HTL input stream. The output from the wet oxidation reactor with molten salt cooling (J) is fed through a water phase heat exchanger (H) to pre-heat the wastewater stream prior to wet oxidation, then released through a valve into a water/gas separator (M) that separates a gaseous phase and a comparatively purified water phase.

Figure 3:
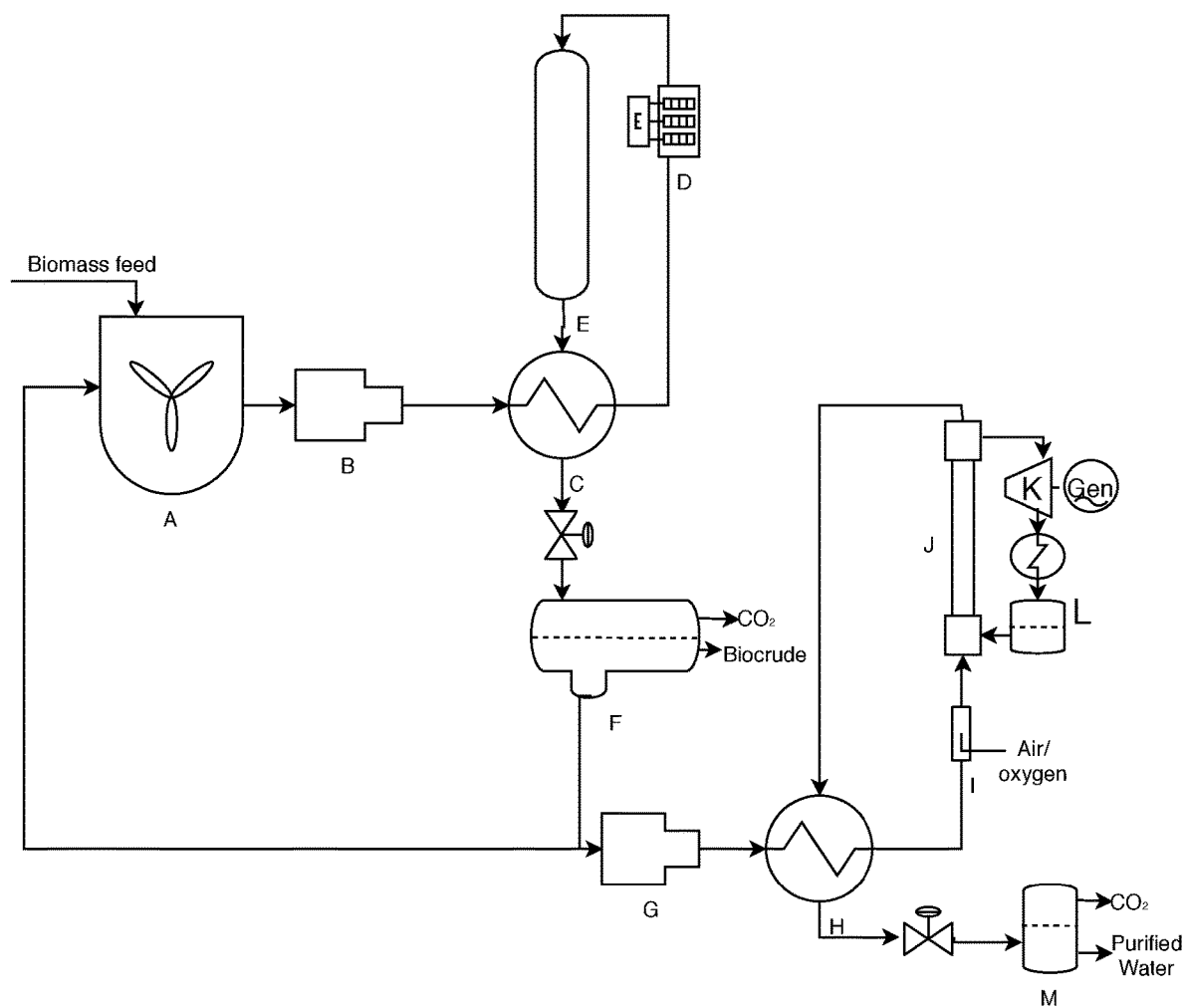
FIG. 3 shows one embodiment of an HTL system of the invention in which energy transfer from wet oxidation is conducted via conversion to electrical energy.

Other non-limiting examples of methods and systems of the invention are described in FIG. 3, any feature of which may be used in an HTL system of the invention in combination with any other system or feature known in the art. As shown, a biomass feed stream is combined with some portion of aqueous phase HTL product in a feed mixer (A). The mixed feedstock and recycled aqueous phase slurry are pre-heated by being fed through a high pressure feed pump (B) such as, for example, any of the pump systems described in WO2016/004958, into a heat exchanger (C). The pre-heated feed stream is further heated by electrical trim heating by an electrical heater (D). The input feed heated to process temperature is further pumped into an HTL reactor (E). Output from an HTL reactor (E) is fed through a heat exchanger (C) to contribute to pre-heating of the input feed, then released through a valve into a three phase separator (F) that separates a gaseous product phase, a product oil phase and an aqueous product phase. Some portion of the aqueous product phase separated by a three-phase separator (F) is recycled to the HTL process by mixing with incoming feedstock in a feed mixer (A). Some portion of the aqueous product phase separated by a three phase separator (F) is pumped through a water phase feed pump (G) through a water phase heat exchanger (H) to pre-heat the wastewater stream prior to its being aerated/oxygenated by an air/oxygen sparger (I). The pre-heated, aerated/oxygenated wastewater stream is further pumped into a wet oxidation reactor (J). Pressurized steam produced during the wet oxidation process in the wet oxidation reactor (J) is used to drive a steam turbine (K) which is associated with an electrical power generator. A steam condenser tank (L) provides recirculation of condensed steam back into the wet oxidation process. Output from the wet oxidation reactor (J) which is not used for electrical power generation is fed through a water phase heat exchanger (H) to pre-heat the wastewater stream prior to wet oxidation, then released through a valve into a water/gas separator (M) that separates a gaseous phase and a comparatively purified water phase.

In some embodiments, the invention provides a HTL system comprising:
an inlet unit for aqueous slurries of biomass,
a high pressure pump providing an outlet pressure of at least 100 bar, or at least 150 bar or over 200 bar in communication with the inlet unit,
a heat exchanger, adapted to being heated directly or indirectly via the HTL product stream,
a continuous HTL reactor,
a continuous wet oxidation reactor adapted to process aqueous wastewater generated by the HTL reactor, and
a HTL process heater that is either electrical or adapted to receive thermal energy from the wet oxidation reactor, either through direct thermal contact or indirectly via a heat exchange fluid or gas;
which HTL system may optionally further comprise any one or more of:
one or more heat exchangers adapted to cool the HTL product stream to a lower temperature while heating the HTL feed stream,
a solid liquid separation system, adapted to remove particulate solids from the HTL product stream,
a pressure let down unit adapted to reduce the pressure of the HTL product stream to below 50 bar, or lower than 20 bar, or lower than 5 bar, or lower than 2 bar
a three-phase separation system, adapted to separate gas, oil and aqueous phases in the HTL product stream,
a high pressure pump adapted to pressurize all or part of the HTL aqueous product phase to an outlet pressure of at least 150 bar, or at least 180 bar or more than 200 bar,
a heat exchanger, adapted to be heated directly or indirectly via the product stream from the wet oxidation reactor,
one or more high pressure gas injector(s) adapted to inject air or oxygen into the wet oxidation feed stream,
one or more heat exchangers adapted to cool the wet oxidation product stream to a lower temperature while heating the wet oxidation feed stream,
a pressure let down unit adapted to reduce the pressure of the wet oxidation product stream to less than 10 bar.

In some embodiments, high pressure pumps may include one or more positive displacement pumps such as piston pumps, a membrane pumps, gear pumps, lobe pumps or hydraulic driven pumps, in which a pump chamber changes volume due to the admission of a hydraulic fluid.

In some embodiments, the high pressure gas injector is a gas sparger providing good contact between the aqueous and gas phase.

In some embodiments, the inlet unit is in fluid communication with a feed buffer tank.

In some embodiments, preheating of the aqueous wastewater feed to wet oxidation is to a temperature above 150° C. preferably above 200° C. preferably above 250° C. In some embodiments, after pre-heating the wet oxidation feed stream, an oxidant is added, preferably oxygen at above 15%, preferably above 20%, 50%, 90% with or without the presence of a catalyst, such as a metal salt.

In some embodiments, the invention provides a method of hydrothermal liquefaction (HTL) comprising the steps of:
providing a HTL feed stream of biomass mixed with HTL product aqueous phase, and
conducting continuous HTL conversion of the HTL feed stream in such manner that some portion of the HTL product aqueous phase is recirculated to the HTL feed stream and some portion of the HTL product aqueous phase is subject to wet oxidation, wherein heat produced by the wet oxidation process is used to heat the HTL feed stream.

The embodiments described are exemplative only and not intended to limit the scope of the invention as defined by the claims.

PATENT REFERENCES

WO2016/169927
WO2016/004958
CN1066938
UK1911294.5

NON-PATENT REFERENCES

Bhargava, S. et al. "Wet Oxidation and Catalytic Wet Oxidation," Ind. Eng. Chem. Res. (2006) 45:1221-1258.

Gu, Y. et al. "Biological systems for treatment and valorization of wastewater generated from hydrothermal liquefaction of biomass and systems thinking: A review," Bioresource Technology (2019) 278:329.

He, W. et al. "Application of hydrothermal reaction in resource recovery of organic wastes," Resources, Conservation and Recycling (2008) 52:691-699.

Jensen, C. et al. "Fundamentals of Hydrofaction TM: Renewable crude oil from woody biomass," Biomass Cony. Bioref. (2017) 7:495-509.

Leng, L. and Zhou, W., "Chemical compositions and wastewater properties of aqueous phase (wastewater) produced from the hydrothermal treatment of wet biomass: A review," ENERGY SOURCES PART A-RECOVERY UTILIZATION AND ENVIRONMENTAL EFFECTS (2018) 40(22):2648.

Si, B. et al. "Inhibitors degradation and microbial response during continuous anaerobic conversion of hydrothermal liquefaction wastewater," Science of the Total Environment (2018) 630:1124.

Xu, D. et al. "Catalytic supercritical water gasification of aqueous phase directly derived from microalgae hydrothermal liquefaction," International journal of hydrogen energy (2019) 44:26181.

Zhu, Y. et al. "Techno-economic analysis of alternative aqueous phase treatment methods for microalgae hydrothermal liquefaction and biocrude upgrading system," Algal Research (2019) 39:101467.

Van Dyk et al. (2019) Assessment of likely maturation pathways for production of biojet fuel from forest residues. Vancouver, University of British Columbia https://gardn.org/wp-content/uploads/2019/11/GARDN-NEC-21-ATM-project-final-report-public-release-1.pdf

BRIEF DESCRIPTION OF FIGURES

FIG. 1: Integrated HTL and wet oxidation system
A: Feed Mixer
B: Biomass Feed pump—high pressure
C: Heat exchanger
D: Co-Current wet oxidation and HTL reactors
E: Three Phase separator
F: Water Phase Feed Pump
G: Heat exchanger water phase
H: Air/oxygen injector or sparger
I: Water gas separator FIG. 2: HTL and wet oxidation system with external heat transfer loop
A: Feed Mixer
B: Biomass Feed pump—high pressure
C: Heat exchanger
D: Co-Current heat exchanger w. molten salt
E: HTL reactor
F: Three Phase separator
G: Water Phase Feed Pump
H: Heat exchanger water phase
I: Air/oxygen injector or sparger
J: Wet ox reactor with molten salt cooling
K: Molten salt buffer
L: Molten salt pump
M: Water gas separator FIG. 3: HTL and wet oxidation system with decoupled heating
A: Feed Mixer
B: Biomass Feed pump—high pressure
C: Heat exchanger
D: Electrical heater for trim heating of HTL
E: HTL reactor
F: Three Phase separator
G: Water Phase Feed Pump
H: Heat exchanger water phase
I: Air/oxygen injector or sparger
J: Wet ox reactor with high pressure steam production
K: Steam turbine with generator
L: Steam condenser with tank
M: Water gas separator

The invention claimed is:

1. A hydrothermal liquefaction (HTL) system for production of bio-crude oil comprising:
an inlet unit for aqueous slurries of biomass;
a high pressure pump providing an outlet pressure of at least 100 bar in fluid communication with the inlet unit;
a continuous hydrothermal liquefaction (HTL) reactor comprising one or more separate HTL reactors, adapted to produce bio-crude oil;
a heat exchanger, adapted to being heated directly or indirectly via a product stream of a hydrothermal liquefaction (HTL) reactor or a wet oxidation reactor;
a continuous wet oxidation reactor comprising one or more separate wet oxidation reactors adapted to process aqueous wastewater generated by the continuous hydrothermal liquefaction (HTL) reactor; and
a hydrothermal liquefaction (HTL) process heater that is adapted to receive thermal energy from a wet oxidation reactor,
wherein the one or more separate hydrothermal liquefaction (HTL) reactors and the one or more separate wet oxidation reactors are arranged co- or counter-current in direct thermal contact on opposite sides of a tubular heat exchanger optionally within a multitubular system.

2. The hydrothermal liquefaction (HTL) system according to claim 1, wherein the hydrothermal liquefaction (HTL) system further comprises a separator that separates a product stream from the continuous hydrothermal liquefaction (HTL) reactor into a gaseous product phase, a product oil phase and an aqueous product phase.

3. The hydrothermal liquefaction (HTL) system of claim 2, wherein the separator comprises a three-phase separator.

4. The hydrothermal liquefaction (HTL) system of claim 1, further comprising a wet oxidation gas flow control system adapted to control a flow of air or an oxygen rich gas stream transported to the continuous wet oxidation reactor so as to ensure a desired conversion rate or heat production and to avoid overheating of the continuous wet oxidation reactor.

5. The hydrothermal liquefaction (HTL) system of claim 1, wherein both the one or more separate wet oxidation and the one or more separate hydrothermal liquefaction (HTL) reactors have similar dimensions.

6. A method of hydrothermal liquefaction (HTL) comprising the steps of:
   providing an HTL feed stream of biomass mixed with HTL product aqueous phase, and
   conducting continuous HTL conversion of the HTL feed stream in such manner that some portion of the HTL product aqueous phase is recirculated to the HTL feed stream and some portion of the HTL product aqueous phase is subject to wet oxidation process, wherein heat produced by the wet oxidation process is used to heat the HTL feed stream,
   wherein the HTL conversion and the wet oxidation process are conducted in separate reactors arranged co- or counter-current in direct thermal contact on opposite sides of a tubular heat exchanger.

7. The method of claim 6, wherein a flow of air or oxygen rich gas stream supplied to the wet oxidation process is controlled so as to ensure a desired conversion rate or heat production and to avoid overheting of the wet oxidation reactor.

\* \* \* \* \*